April 7, 1936. H. T. KINGSBURY 2,036,636
POSTAL SCALE
Filed Jan. 4, 1933 2 Sheets-Sheet 1
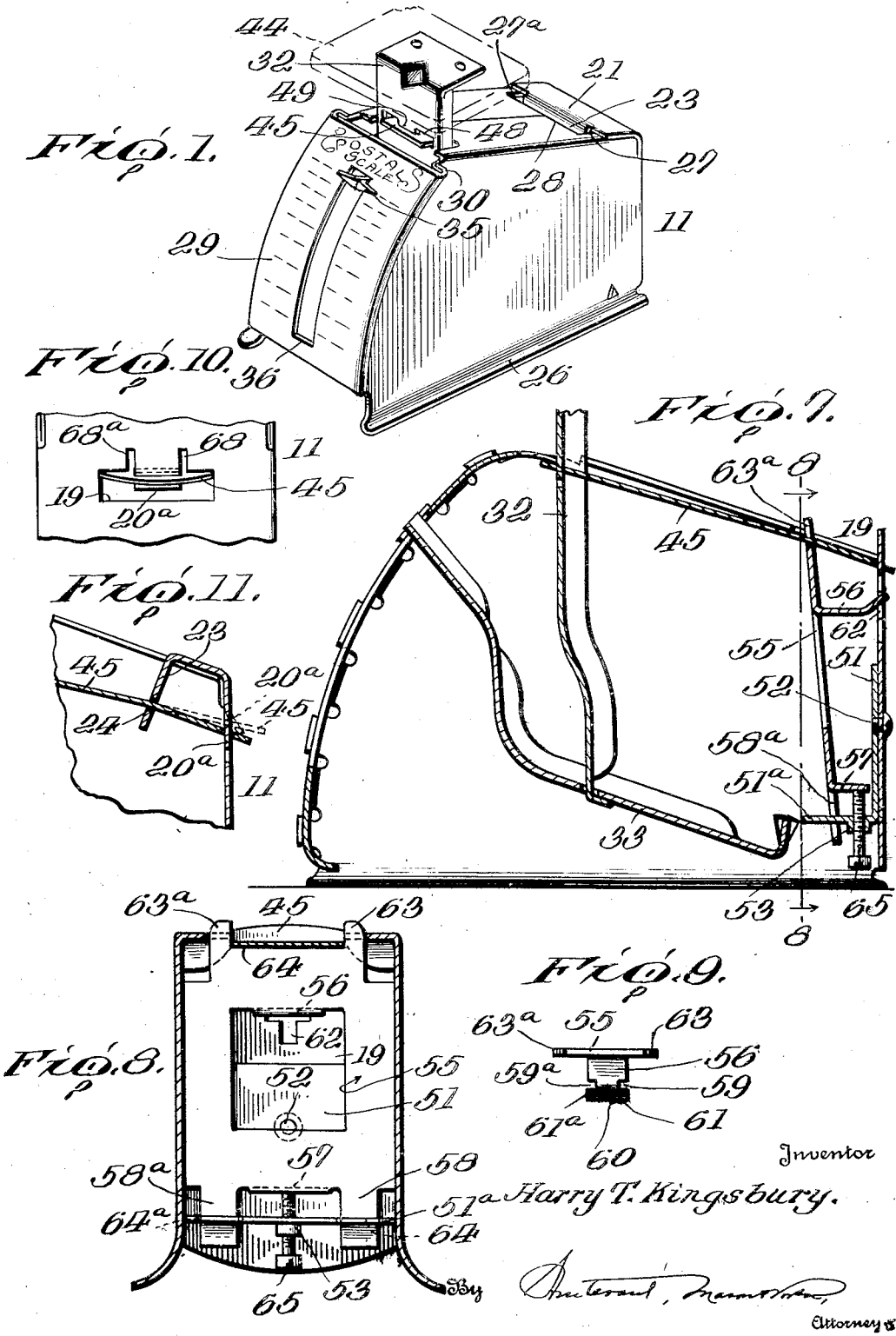
Inventor
Harry T. Kingsbury.

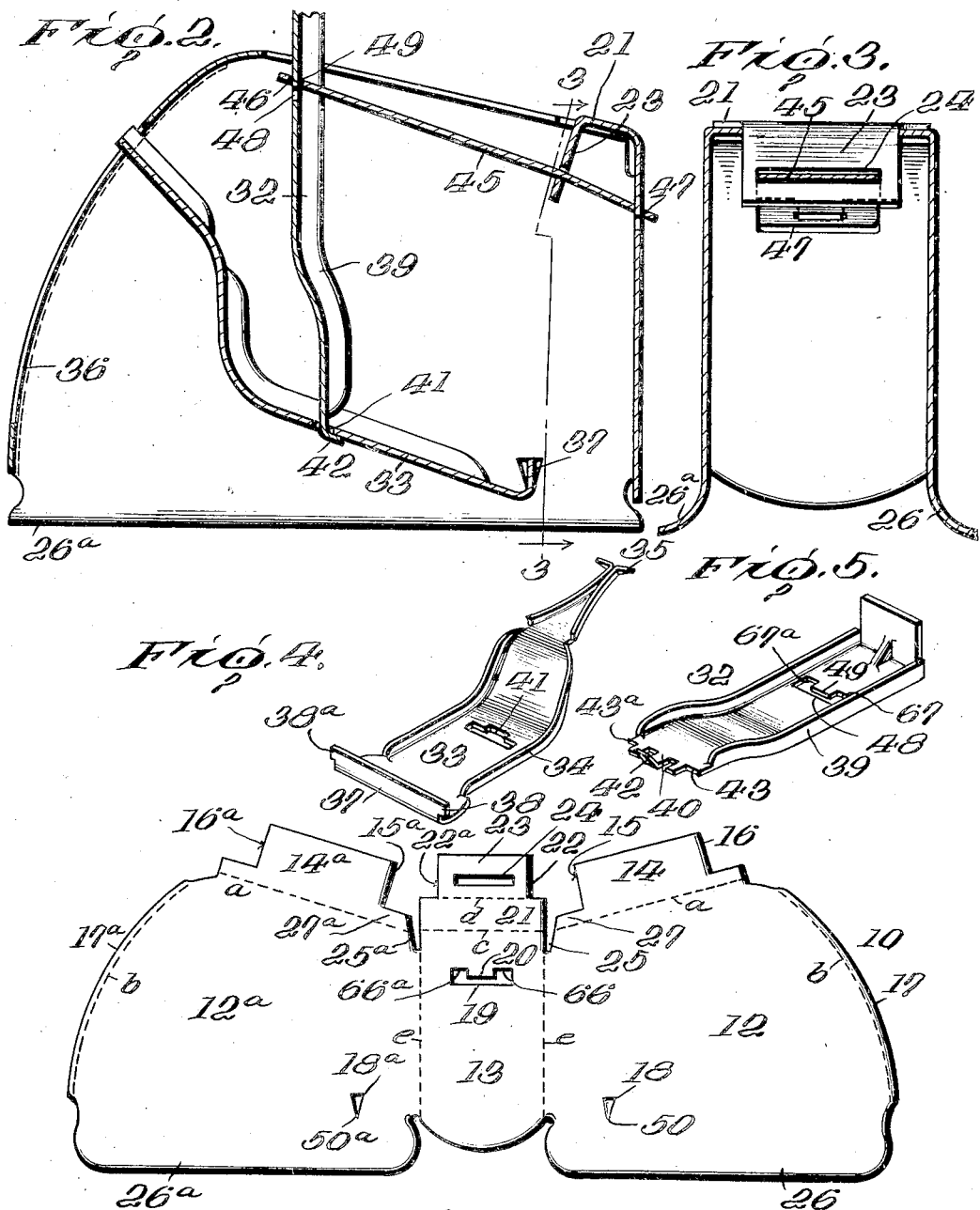

Patented Apr. 7, 1936

2,036,636

UNITED STATES PATENT OFFICE 2,036,636

POSTAL SCALE

Harry T. Kingsbury, Keene, N. H., assignor to Kingsbury Mfg. Company, Keene, N. H., a corporation of New Hampshire Application January 4, 1933, Serial No. 650,187

9 Claims. (Cl. 265—39)

This invention relates to improvements in weighing scales, and more particularly to improvements in postal scales which are adapted to be used in weighing letters and other documents to be sent through the mails.

An object of the present invention is to provide a postal scale wherein the downward movement of the load receiving platform is resisted by a flat spring member which is supported and which exercises a bearing action at three points.

A further object of the invention is to provide a postal scale wherein the downward movement of the receiving platform is resisted by a flat resilient member the ends of which work freely in suitable bearings and wherein an intermediate portion of the resilient member rests upon an adjustable fulcrum.

A further object of the invention is to provide a postal scale, of the type referred to, wherein the casing therefor is formed from a single metal blank and is adapted to support the weighing mechanism without the use of screws or other separable fastening elements.

A further object of the invention is to provide a postal scale, of the type referred to, wherein the operating parts of the weighing mechanism are connected together in suitable relationship without the use of any separable fastening elements.

A further object of the invention is to provide a postal scale, of the type referred to, wherein a fulcrum, upon which the spring member rests, is adjustably secured to the casing whereby any lack of uniformity in the spring members may be compensated for in order to assure accurate weighing.

The invention still further aims to provide a postal scale, of the type referred to, wherein the weighing mechanism is enclosed within and supported by a sheet metal casing without the use of fastening elements thereby greatly diminishing the cost of manufacture and affording a greatly simplified construction which may be accurately adjusted to insure correct weighing at all times.

These and other objects of the invention will be obvious and will be hereinafter more fully described and claimed.

In the drawings:

Figure 1 is a perspective view of the improved postal scale.

Fig. 2 is an enlarged side view of the same in section.

Fig. 3 is an enlarged end view of the same in section, taken along line 303 of Fig. 2.

Fig. 4 is a perspective view of the indicator arm.

Fig. 5 is a perspective view of the platform supporting arm.

Fig. 6 is a plan view of the blank which forms the casing when folded.

Fig. 7 is a side view, in section, showing a modified form of adjustable fulcrum.

Fig. 8 is an end view of the same, in section, taken along line 8—8 of Fig. 7.

Fig. 9 is a top view of the modified form of adjustable fulcrum.

Fig. 10 is a fragmentary end view showing a slightly modified form of securing the end of the spring member in the casing.

Fig. 11 is a fragmentary side view of the same in section showing another form of adjustment.

In general, the present invention provides a postal scale wherein a receiving platform is mounted on a supporting standard which is loosely mounted on an indicating arm. The indicating arm is, in turn, pivotally mounted in the sides of a sheet metal casing which encloses the weighing mechanism and thus excludes dust and other foreign matter. The downward movement of the platform and standard, which operates the indicating arm, is resisted by a flat resilient member one end of which is mounted on the casing by means of a free bearing connection and the other end of which is mounted in a similar manner on the supporting standard. A fulcrum member, which is connected to the casing intermediate the ends of the flat resilient member and upon which a portion of the resilient member rests, is capable of being adjusted thereby providing a convenient manner for adjusting the flat resilient member in order to obtain accurate weighing.

Referring more in detail to the accompanying drawings, and particularly at this time, to Fig. 6, in which is shown the blank 10 which, when properly folded, forms the scale casing 11. The blank 10 consists of a single sheet of metal having side portions 12, 12ª which form the sides of the casing and an intermediate portion 13 which forms the back of the casing. Each side portion is provided with a flap portion 14, 14ª which is adapted to be folded inwardly at right angles thereto along lines a, a. Each flap portion is provided with right angled cut out portions 15, 16, 15ª, 16ª which are spaced from the folding lines a, a. The curved edges 17, 17ª of the side portions are adapted to be folded outwardly at right angles thereto along the lines b, b. In the corner of each side portion near the central or intermediate portion 13 is an aperture 18, 18ª which is substantially the shape of an inverted equilateral triangle, the apex of which points downwardly. The intermediate portion 13 is provided with an aperture 19 into which extends a tongue member 20. The upper portions 21 of the intermediate portion is adapted to be folded inwardly along line c. The corners 22, 22ª of this upper portion 21 are cut out to form a tab portion 23 in which there is a horizontal slot 24. This tab portion 23 is adapted to be again folded downwardly along line d so that it will extend into the interior of the casing 11. Between the intermediate portion 13 and the adjacent upper edges of the side portions 12, 12ª are cut-out portions 25, 25ª of a substantially rhombic configuration to permit the proper folding of the blank.

It is apparent, therefore, that the side portions 12, 12ª are bent at right angles to the intermediate portion 13 along lines e, e until they are parallel to each other. The lower edges 26, 26ª of the side portions are curved outwardly to form a stable support as shown in Fig. 1. The flap portions 14, 14ª are then folded inwardly along lines a, a and thus form a closed cover to the casing. Since the cut-out portions 15, 15ª are spaced from the lines a, a, flanges 27, 27ª are provided, upon which rest the sides of the upper part 21 of the intermediate portion 13 when the same is folded along line c. The cut-out portions 15, 15ª and the flanges 27, 27ª form an opening 28 into which the tab portion 23 extends when bent downwardly along line d. The curved edge portions 17, 17ª of the side portions 12, 12ª are bent outwardly substantially at right angles so that a graduated indicating plate 29 having inwardly curved edges 30 may be slipped thereon. It will also be seen that the cut-out portions 16, 16ª, when bent, form an opening 31 through which a platform standard 32 may extend. This opening is sufficiently large to allow the standard to be tilted slightly when the spring is adjusted.

The indicating arm 33 is made of sheet metal and has upturned edges 34 to add strength thereto. The indicating arm tapers toward a point and the upturned edges are there turned at right angles to form a pointer 35, which is adapted to extend through a slot 36 in the indicating plate 29. The base of the indicating arm is of a width slightly less than the distance between the sides 12, 12ª of the casing. The base of the indicating arm is turned upwardly as at 37 and provided with outwardly extending lugs 38, 38ª each of which is adapted to fit in the aperture 18 18ª respectively of the casing. The lower edge of each lug bears on the casing at the lower extremity of the corresponding apertures whereby the indicating arm is free to oscillate within the limits of the apertures which may be varied as desired.

The platform supporting standard 32 is likewise made of sheet metal and is provided with upturned strengthening edges 39. The lower end of the standard is provided with a tongue portion 40 which extends through an aperture 41 in the indicating arm 33 and is then slightly bent as at 42 so that it will not slip out of the aperture. Portions 43, 43ª extend beyond the aperture 41 and form bearing surfaces which rest directly on the indicating arm and thus support the platform. The standard 32, as has heretofore been pointed out, extends through the opening 31 and has secured to the top thereof a load receiving platform 44.

A flat spring member 45 is provided at each end thereof with slots 46, 47. One end of the spring member is adapted to extend through an opening 48 in the standard 32 which has a tongue 49 which enters the slot 46 in the spring member to retain the same in position. The opposite end of the spring member extends through the opening 19 in the back 13 of the casing and the tongue 20 is likewise adapted to enter the opening 47 in the spring member to keep the same in position. The spring member also passes through the slot 24 in the tab 23 which thus provides a fulcrum intermediate the ends of the spring member and serves to retain the ends of said spring member in proper position with respect to the retaining tongues 49, 20.

It will be seen that the spring member bears upwardly against the edges 66, 66ª of the opening 19 in the casing and against the edges 67, 67ª in the opening 48 in the standard. A portion of the spring member 45 also bears downwardly on the lower edge of the slot 24, thus providing a three point suspension to hold the spring member in proper position at all times.

It will thus be seen, by referring to Figs. 1–5, that the present invention provides an extremely simple and efficient postal scale wherein the casing therefor serves to support the weighing mechanism without the use of separable fastening elements. When a load is placed upon the platform, which is secured to the top of the standard 32, the platform and standard will be urged downwardly against the action of the flat spring member 45. As the standard moves down, the edges 43, 43ª thereof will bear upon the indicating arm 33 and cause the same to be rotated about the pivot points 50, 50ª so that the pointer 35 will travel over the face of the indicating plate 29 and, upon coming to rest, it will point to the correct weight on the graduated plate 29. It will be noted that the tongues 49, 20 extend into the slots 46, 47 respectively in the ends of the spring member 45 and thus provide a loose or free bearing to hold the spring member. The spring member passes through a slot 24 in the fulcrum 23 which prevents the ends of the said spring member from becoming disengaged from the free end bearings. The spring member 45 also serves to retain the standard 32 and platform in the proper vertical position, so that the standard will not touch the casing around the opening 31.

Figs. 7 and 8 illustrate a modified form of adjustable fulcrum which will now be briefly described. A right angle bracket 51 is secured to the inside of the back 13 of the casing by a screw 52 or the like. The inwardly extending arm 51ª of the bracket 51 is provided with a threaded opening 53 and two slots 54, 54ª. An additional bracket 55 having two outwardly extending portions 56, 57 is provided with two depending portions 58, 58ª which are adapted to extend through the slots 54, 54ª respectively in the bracket arm 51ª. The outwardly extending portion 56 is provided with two cut-out portions 59, 59ª which provide a narrow neck portion 60 and two lugs 61, 61ª. The end of the portion 56 passes through the opening 19 in the back 13 of the casing and is then pressed down so that the neck portion 60 passes through a smaller part 62 of the opening 19. The smaller part 62 of the opening 19 is of a width less than that of the member 56 so that the lugs 61, 61ª prevent the bracket 55 from moving horizontally to become disengaged. Two upwardly extending portions 63, 63ª at the top of the bracket 55 form a bearing surface 64 therebetween. The flat spring member 45 rests upon this surface 64. An adjusting screw 65 passing through the threaded opening 53 in the bracket arm 51ª is adapted to contact with the portion 57 of the bracket 55. It will be seen that the bracket 55 is free to move vertically only and may be adjusted by turning the screw 65 to raise or lower the same whereby the surface 64 is raised or lowered to adjust the spring member 45, or the pointer so that it will point exactly to the zero mark on the indicating plate 29.

In a similar manner, referring to Fig. 1, the flanges 27, 27ª may be bent upwardly or downwardly by a suitable tool. In this way, since the portion 21 rests upon said flanges, the tongue 23 may be raised or lowered so that the spring fulcrum may be adjusted to compensate for any lack of uniformity in the spring member 45 and to adjust the pointer to zero.

Referring to Figs. 10 and 11, another method of adjusting the spring member 45 is illustrated. In this instance, the back of the casing 11 is cut to provide slots 68, 68ª adjacent the tongue 20ª so that the tongue may be easily bent. The tongue 20ª extends into the slot 47 in the spring member 45 in a similar manner to that shown in Fig. 2. The spring member also passes through the slot 24 in the fulcrum member 23. To correct the reading of the indicating arm 33 on the dial 29, in this modification, however, the tongue 20ª may be bent outwardly or inwardly in order to vary the resistance offered by the spring member to the downward movement of the standard 32. The bending of the tongue 20ª will, of course, slide the spring 45 in the slot 24 and so increase or diminish the length of the spring from the fulcrum to the standard 32 according to whether the tongue is bent inwardly or outwardly. If the tongue 20ª is bent outwardly, as shown in dotted lines in Fig. 11, the effective length of the spring member 45 from the fulcrum 23 to the standard 32 will be diminished and the resistance offered to the tendency of the standard to move downwardly will be increased so that the pointer may be adjusted to indicate the correct weight at all times. In a similar manner, the tongue may be bent inwardly to lessen the resistance which the spring member offers to the downward movement of the standards 32. It will be noted that the spring member is still supported at the three points mentioned above.

Of course minor changes in details of construction may be made without departing from the scope of the invention as set forth in the appended claims.

Having thus fully described my invention, what I claim as new and desire to secure by Letters Patent, is:—

1. A postal scale comprising a casing, an indicating arm pivotally mounted in the sides of said casing, a standard pivotally connected to said indicating arm, a platform supported by said standard, a flat resilient member adapted to resist the downward movement of said standard, and an independent fulcrum located intermediate the ends of said resilient member, an intermediate portion of said resilient member being adapted to rest upon said fulcrum.

2. A postal scale comprising a casing, an indicating arm pivotally mounted in said casing, a standard pivotally connected to said indicating arm, a platform supported by said standard, a flat resilient member adapted to resist the downward movement of said standard, a fulcrum member upon which an intermediate portion of said resilient member is adapted to rest, and means for adjusting said fulcrum member in a substantially vertical plane.

3. A postal scale having a casing and weighing mechanism including a spring member adapted to resist the downward movement of said weighing mechanism, said casing comprising a metal blank having an intermediate section between similar sections, said similar sections adapted to be folded adjacent the intermediate section to form the sides of the casing, and said intermediate section forming the back of the casing, extensions on said similar sections adapted to be folded substantially at right angles thereto to form the casing top with openings therein, an extension on said intermediate section adapted to be twice bent so that a portion thereof extends through one of said openings in the top whereby to provide a fulcrum for said spring member.

4. A postal scale comprising a casing, an indicating arm pivotally mounted in the sides of said casing, a platform supporting standard mounted on said indicating arm and having a limited pivotal movement thereon, a flat spring member adapted to resist the downward movement of said standard, means for connecting one end of said spring member to said standard, means for connecting the other end of said spring member to said casing, and means for supporting an intermediate portion of said spring member, said last named means being adjustable in substantially a vertical plane whereby to properly adjust the weighing mechanism.

5. A postal scale comprising a casing, an indicating arm pivotally mounted in the sides of said casing, a platform supporting standard pivotally mounted on said indicating arm, a flat spring member having one end thereof connected to said standard and having the other end thereof connected to said casing and adapted to resist the downward movement of said standard, and a bracket adapted to support an intermediate portion of said spring member, said bracket being adjustably secured to said casing.

6. A postal scale comprising a casing, a standard for supporting a platform, indicating mechanism operatively connected to said standard, a flat resilient member adapted to resist the downward movement of said standard, said resilient member being connected at one end thereof to said standard and having an aperture at the opposite end thereof for connection with a tongue on said casing, and means intermediate the ends of said resilient member for forming a bearing surface therefor whereby to maintain the connection between said opposite end of said resilient member and said casing.

7. A postal scale comprising a casing having an opening at the rear end thereof and a tongue extending into said opening, a standard for supporting a platform, said standard having an opening and a tongue extending into the same, indicating mechanism operatively connected to said standard, a flat resilient member adapted to resist the downward movement of said standard, said resilient member having openings at each end thereof for the reception of the tongue on said casing at one end and for the reception of the tongue on said standard at the opposite end, and a member intermediate the ends of said resilient member for supporting the same and for aiding in retaining the ends thereof connected to said standard and said casing.

8. A postal scale comprising a casing, an indicating arm pivotally mounted in the sides of said casing, a platform supporting standard pivotally connected to said indicating arm, a flat resilient member having one end thereof connected to the casing and having the other end thereof connected to the standard, and means intermediate the ends of said resilient member for providing a fulcrum for said resilient member, said fulcrum being adjustable in a substantially vertical plane.

9. A postal scale comprising a casing, a platform supporting standard, indicating mechanism, a spring member adapted to resist the downward movement of said platform, and means for supporting said spring member, said means including an interlocked connection between said casing and one end of said spring member, an interlocked connection between the opposite end of said spring member and said standard, and an intermediate fulcrum for said spring member.

HARRY T. KINGSBURY.